(12) United States Patent
Tanaka

(10) Patent No.: US 9,352,997 B2
(45) Date of Patent: May 31, 2016

(54) MELT MOLDING METHOD OF GERMANIUM

(71) Applicant: Nachi-Fujikoshi Corp., Toyama (JP)

(72) Inventor: Kunihiro Tanaka, Toyama (JP)

(73) Assignee: Nachi-Fujikoshi Corp., Toyama (JP)

( * ) Notice: Subject to any disclaimer, the term of this patent is extended or adjusted under 35 U.S.C. 154(b) by 401 days.

(21) Appl. No.: 13/928,994

(22) Filed: Jun. 27, 2013

(65) Prior Publication Data

US 2015/0001752 A1 Jan. 1, 2015

(51) Int. Cl.
*C01B 33/021* (2006.01)
*C03C 3/32* (2006.01)
*G02B 1/02* (2006.01)

(52) U.S. Cl.
CPC .... *C03C 3/32* (2013.01); *G02B 1/02* (2013.01)

(58) Field of Classification Search
CPC .......... C03C 3/253; G02B 1/02; B22D 17/02; B22D 27/045; B22D 23/06; B22D 27/04; B22D 21/02; C30B 21/00; C30B 21/02; C30B 13/14
See application file for complete search history.

(56) References Cited

U.S. PATENT DOCUMENTS 5,885,345 A * 3/1999 Sakuragi ................ C30B 11/00
117/16

FOREIGN PATENT DOCUMENTS

| JP | 63-157754 | 6/1988 |
| JP | 07-314123 | 12/1995 |
| JP | 2013-035000 | 2/2013 |

* cited by examiner

*Primary Examiner* — Galen Hauth
(74) *Attorney, Agent, or Firm* — Harness, Dickey & Pierce, PLC

(57) ABSTRACT

In a melt molding method of germanium, the germanium which is brought into a molten state is sealed in molding dies in an inert gas atmosphere. The molding dies are temperature-controlled from the outside. While gradually cooling the molding dies at a portion or a plurality of portions thereof up to the whole, the germanium is gradually solidified from a side of the portion or sides of the plurality of portions up to the whole. An external ambient temperature of the molding dies is controlled to decrease gradually while ensuring a temperature below a germanium melting point temperature but higher than an inner temperature of the molding die which is cooled. After solidification of the germanium is completed, cooling of the molding dies is continued, and the external ambient temperature is decreased to mold the germanium.

3 Claims, 3 Drawing Sheets

MELT MOLDING METHOD OF GERMANIUM

BACKGROUND OF THE INVENTION (1) Field of the Invention

The present invention relates to a melt molding method of germanium, and particularly to melt molding of a germanium lens and the like which are useful for an infrared lens and the like.

(2) Description of Related Art

Conventionally, in JP-A-63-157754 for example, a germanium lens for infrared measurement is produced by increasing the temperature of a germanium raw material to not lower than a melting point, casting the liquid germanium into a mirror-finished lens casting mold, and cooling the casting mold. Further, in this method, a nitrogen gas atmosphere is adopted in order to prevent entry of impurities, and further, sealed nitrogen gas is evacuated to produce a vacuum, and air and the like are defoamed from the germanium liquid. Thereby, the germanium lens is molded into a required shape at a time.

However, unlike other metals and glass, germanium has the problem of expansion in volume when germanium is solidified, causing cracks, bulges, and depressions. Thus, in JP-A-7-314123, melt molding is performed by a casting mold by injecting a germanium molten liquid at a high pressure into a casting mold, cooling the germanium molten liquid while enhancing the density, decreasing the injection pressure at a temperature close to a solidifying point to absorb pressure caused by solidifying expansion of the material and prevent occurrence of internal distortion, and enhancing the injection pressure again at a temperature not higher than the solidifying point. Further, temperature control is performed by measuring the temperature of a molding die and the temperature inside a heating furnace with a temperature monitor. Further, a gas supply tube is provided at a lower portion of the molding die, and reducing gas is supplied to substitute for moisture and the like in raw material powder.

BRIEF SUMMARY OF THE INVENTION

However, there is the problem that a stable shape cannot be always ensured even if high-pressure injection is performed. When germanium is solidified, crystallization does not proceed uniformly in the molding site and a starting point of the crystallization is not constant. Further, flowability cannot be not expected in the case of the molten liquid of germanium, and therefore flow by expansion at the time of solidification is a little, so that the molten liquid of germanium is difficult to fit to the casting mold shape. For this reason, it is conceivable that even if high-pressure injection is performed, thermal expansion at the solidifying point cannot be completely prevented, and thus generation of cracks, bulges and depressions still takes place. Further, there is also the problem that in order to cope with the expansion at the time of solidification, a large-sized clamping device is required, and disadvantageously the entire apparatus becomes large and the cost also increases. Furthermore, although temperature control is performed by a temperature monitor, detailed temperature distribution, state and change are not mentioned. Furthermore, although the reducing gas is supplied, it is used only for substitution, and the cooling time is not concerned.

In the light of the above problems, an object of the present invention is to provide a melt molding method of germanium with high precision and few post processing steps, for melt molding of germanium into a casting mold by controlling expansion at a solidifying point of germanium or releasing expansion to a direction in which a molded shape is not influenced. Further, another object is to eliminate the need of a large-sized clamping device or the like, and reduce the size of an entire apparatus. Furthermore, another object is to provide more preferable temperature control and a more preferable cooling method.

Thus, the inventors of the present application filed a Japanese Patent Application of No. 2011-170821, which is not yet published, for a melt molding method of germanium. According to the method, a germanium raw material is sealed into a molding die in an inert gas atmosphere, and heating control of the molding die from the outside is performed. Next, the molding die is gradually cooled as a whole at a portion or a plurality of portions thereof so as to allow germanium to gradually solidify as a whole from a side of the portion or sides of the plurality of portions, while keeping controlling an external ambient temperature of the molding die at a constant temperature higher than a germanium melting point temperature. After solidification of the germanium is completed, cooling of the molding die is continued and the external ambient temperature is lowered to mold a germanium raw material. As a result of study thereafter, it has been found that when the external temperature is controlled to be constant at the time of germanium molding solidification, the temperature difference between the temperature in the molding die which is cooled and the external temperature becomes large, and that if the temperature difference is made small, the molding quality is improved.

Based on the above findings, in the invention of the present application, the aforementioned problems are solved by providing a melt molding method of germanium, wherein a germanium raw material is sealed in a molding die in an inert gas atmosphere, heating control of the molding die is performed from the outside, the germanium raw material in a molten state or after being melted is gradually cooled as a whole at a portion or a plurality of portions of the molding die so as to allow the germanium to gradually solidify as a whole from a side of the portion or sides of the plurality of portions, an external ambient temperature of the molding die is controlled to decrease gradually while ensuring the temperature below a germanium melting point temperature and above an inner temperature of the molding die which is cooled, after solidification of the germanium is completed, the molding die and the external ambient temperatures are further decreased, and the germanium raw material is molded.

Namely, in a solidifying step in the molding die after melting of germanium, instead of cooling the entire molding die (casting mold) in which the molten germanium is contained uniformly or naturally, cooling is started at a portion or a plurality of portions, and the cooling range is gradually expanded to the whole, whereby a starting point of solidification of germanium is controlled. The external ambient temperature of the molding die is kept at a slightly higher temperature than the temperature in the molding die, and thereby the cooling distribution and the cooling speed are stabilized. In the molding die, the temperature increases again after the temperature is decreased, as will be described later, and therefore, the temperature in the molding die does not decrease constantly. Meanwhile, performing control of the external temperature in accordance with the temperature in the molding die is complicated. Therefore, the external ambient temperature is gradually decreased while ensuring the temperature in the molding die. Thereby, the temperature difference between the temperature in the molding die and the external ambient temperature is made small, the solidifying step is stabilized, and solidification is gradually performed to be fitted to the molding die, starting from a portion to the whole thereof. At the time point when solidification is completed, the power supply of the heating device is turned off, the molding die, the germanium (material) and the whole of the apparatus are cooled, so that the germanium molded product is obtained. Note that it goes without saying that the external ambient temperature is set at such a temperature or heat quantity as to enable at least solidification of the germanium in the molding die by cooling of the molding die.

The inventors of the present application measured the temperature in the vicinity of the inside of the molding die at the time of cooling of germanium while performing various experiments, and found that in the vicinity of the solidifying point, the decreased temperature increased to a certain extent due to latent heat, and thereafter, the temperature decreased again. When the external ambient temperature decreased at the same time, external disturbance was so large that the above phenomenon was overlooked, but it is conceivable that the phenomenon can be confirmed by keeping the external ambient temperature constant, cooling only the molding die and measuring the temperature in the molding die, as in the present invention. By the above finding, completion of solidification of germanium can be identified.

Thus, in the invention according to claim 2, the melt molding method of germanium is adopted, wherein the completion of the solidification is completed when, after the cooling is started and the temperature in the molding die starts decrease, temperature increase is started again, and thereafter, the temperature changes to decrease again, while the heating from the outside is stopped, and the temperature in the molding die and the external ambient temperature are decreased.

Further, in order to make the temperature difference between the external ambient temperature and the molding die small, the melt molding method of germanium is adopted, wherein the external ambient temperature of the molding die before the completion of the solidification of the germanium is uniformly decreased, and is set at a temperature not lower than the temperature to which the temperature in the molding die is increased again (claim 3).

Further, the phenomenon of solidification can be indirectly captured by using the temperature as above, and therefore, in the invention according to claims 4 and 5, the melt molding method of germanium is adopted, wherein the completion of the solidification is performed by using a value of a temperature by a temperature sensor which is arranged in an interior of the molding die by being separated from the inside of the molding die.

Further, the molded product of germanium is useful for a lens and the like. Therefore, in the invention according to claims 6 and 7, the melt molding method of germanium is adopted, wherein a molding die inner shape of the molding die is a lens shape, and the portion which cools the molding die is on a center axis of the molding die within the molding die, and gradually cools the whole toward a perpendicular direction to the center axis.

As a more specific method, in the invention according to claims 8 and 9, the melt molding method of germanium is adopted, wherein the molding die inner shape is formed by a concave lower die and a planar or convex upper die, the germanium raw material is put into the lower die, and after the germanium is melted, the upper die is fitted to the lower die to perform molding while an excessive raw material is allowed to escape.

By adopting the concave lower die, the molten liquid of germanium is stored. By adopting the planar or convex upper die, the germanium is filled into the molding die at the time of clamping. Note that the germanium molten liquid can keep a state swelled from an edge surface of the lower die by surface tension, and the molding die inner shape of the upper die may be slightly concave. Further, since the volume increases and an excessive raw material occurs in the case of performing die matching and die clamping from the molten state, and by expansion at the time of solidification, the excessive raw material is allowed to escape.

A molten germanium raw material may be poured (cast) into the molding die, but since the equipment becomes excessively large, a germanium raw material in powder or lump is preferable for simplicity. Therefore, in the invention according to claims 10 and 11, the germanium raw material is a solid.

In the present invention, in the solidifying step in the molding die after melting of germanium, cooling is started from a portion of the die, so that the cooling range is gradually expanded to the whole and the starting point of solidification of germanium is controlled. Further, the external ambient temperature is gradually decreased in the state of a higher temperature than the inside of the molding die, and is made close to the temperature in the molding die, and the temperature difference is made small, whereby the state from start of solidification to the solidification is stabilized, and solidification which is fitted to the molding die is gradually performed from the portion to the whole. Further, after completion of the solidification, the power supply of the heating device is turned off, the temperature of the whole of the apparatus is decreased, and the germanium molded product is obtained, whereby temperature control and the cooling method become easy, the influence of expansion at the time of solidification is eliminated or becomes small, so that cracks, bulges and depressions are eliminated or made few.

Further, in the invention according to claim 2, as for completion of the solidification, a time when, after start of decrease of the temperature in the molding die, the temperature increase is started again, and thereafter, the temperature changes to decrease again is set as completion, and the temperature in the molding die and the external ambient temperature are decreased. Therefore, control is facilitated by identifying where solidification is completed, the solidifying step is stabilized, variations are few, the shape is stabilized, precision is high, and the post processing steps becomes very few.

Further, in the invention according to claim 3, the external ambient temperature can be decreased uniformly while ensuring the temperature not lower than the temperature to which the temperature in the molding die is increased again, and therefore, temperature control is easy.

Furthermore, in the invention according to claims 4 and 5, completion of solidification is performed by using the value of the temperature by the temperature sensor arranged by being separated from the inside of the molding die in the interior of the molding die. Therefore, while indirect measurement is adopted, solidification completion can be easily identified, and temperature control is easy.

Further, in the invention according to claims 6 and 7, the molding die inner shape is a lens shape, and the whole is cooled gradually toward the direction perpendicular to the center axis from the center axis of the molding die within the molding die, and therefore, lens molding is easy, variations are few, and precision is high.

Furthermore, in the invention according to claims 8 and 9, the molding die inner shape is formed by the concave lower die and the planar or convex upper die, after germanium is melted in the lower die, the upper die is fitted to the lower die to mold the germanium and the excessive raw material is allowed to escape. Therefore, burrs can be generated on the outer circumferential side of the necessary portion (lens portion) of the molded product, and therefore, post processing is easy. Further, since even when die matching and die clamping are performed from the molten state, the excessive raw material is allowed to escape, excessive die clamping does not have to be performed, and associated equipment can be simplified.

Further, in the invention according to claims 10 and 11, the germanium raw material is a solid. Therefore, handling is easy, inclusion of impurities or the like is less, and molding of germanium with high purity is enabled.

Note that for the apparatus that carries out the melt molding method of germanium as above, a partial cooling device for the molding die can be only added to the conventional apparatus. For example, a melt molding apparatus of germanium is provided in an inert gas atmosphere. In the apparatus, a lower die having the concave die surface facing upward in which the germanium raw material can be contained, and an upper die having the die surface facing downward are provided, and a relief portion is provided at the edge of the die surface of the upper die or the lower die. The relief portion allows expansion of germanium at the time of solidification to escape outside the necessary die surface of the molding die. An upper die or the lower die temperature sensor is arranged in the vicinity of the die surface of the upper die or the die surface of the lower die, in the interior of the upper die or the lower die, and an accurate temperature is made measurable. Further, a cooling inert gas blowout port which opens toward the die center in plan view from the upper side of the upper die or the lower direction of the lower die is provided, and the molding die is partially cooled.

Furthermore, a moving device which causes the upper die and the lower die to abut on each other or separate from each other, a heating device provided around the upper die and the lower die, and a heating device temperature sensor which measures the temperature of the heating device are provided. Thereby, the need of a large-sized clamping device or the like, the size of the entire apparatus can be reduced, and the more preferable temperature control and cooling method are enabled. Further, a high-pressure clamping is not required, and therefore, the material suitable for the casting mold for germanium even with low strength can be used.

Further, as the material of the upper die and the lower die, glassy carbon is adopted, and the upper die and the lower die are connected to the moving device via an upper support member and a lower support member in which the upper die and the lower die are respectively inserted. Since glassy carbon is adopted as the material of the upper and the lower dies, the molding surface with high precision can be obtained. The cooling inert gas blowout port and a cooling inert gas exhaust port are provided in the inserted portion lower surface of the upper support member or the inserted portion top surface of the lower support member. Since the passage and the flow of the cooling insert gas can be easily designed, the molding precision is higher, and processing in the post step is less.

DETAILED DESCRIPTION OF THE INVENTION

Figure 1:
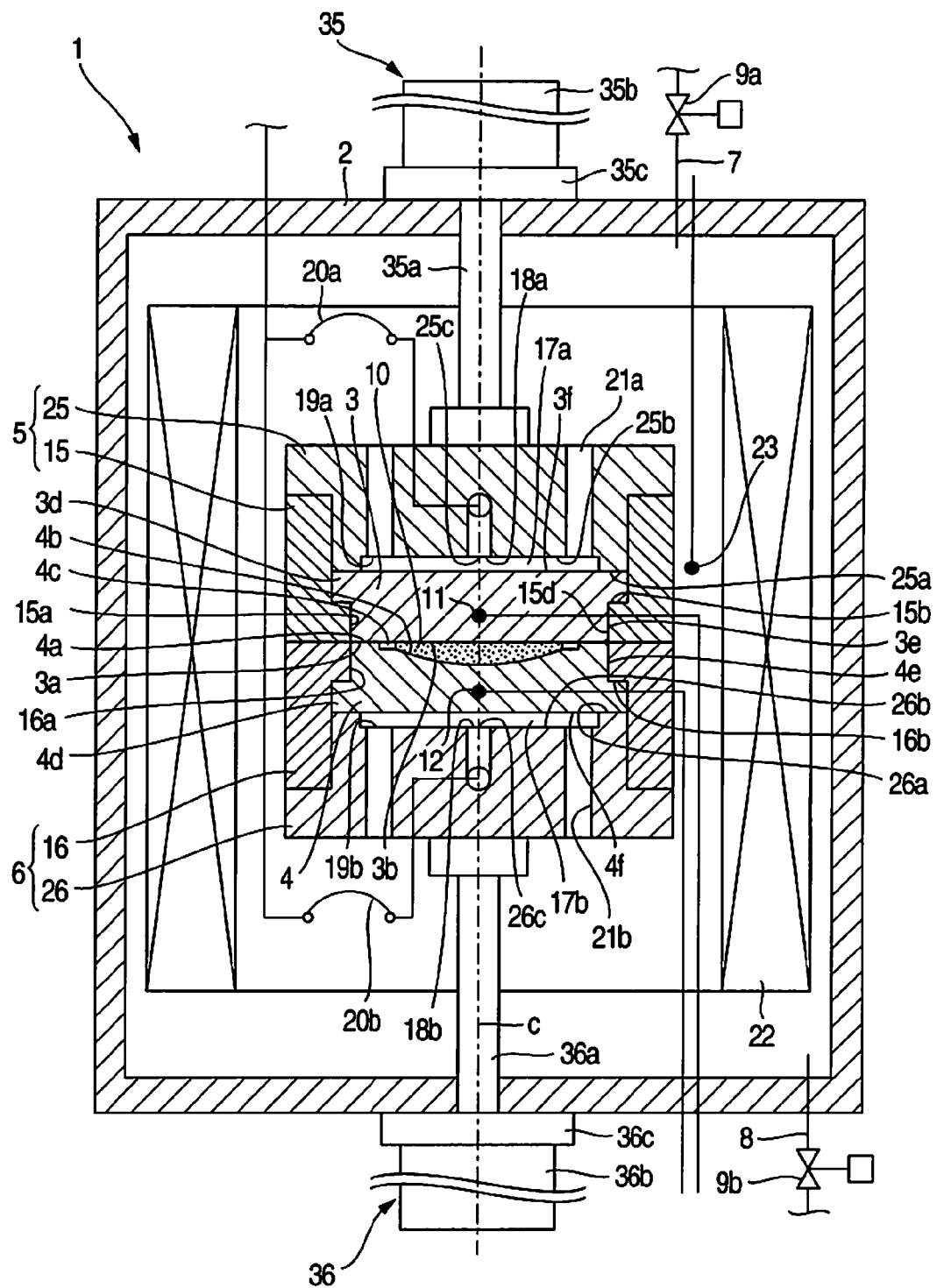
FIG. 1 is an explanatory sectional view of a germanium melt molding apparatus showing an embodiment of the present invention, and shows a state where an upper and a lower dies abut on each other and germanium is melted.

An embodiment of the present invention will be described with reference to the drawings. As shown in FIG. 1, a present melt molding apparatus 1 of germanium is provided with an upper and a lower dies 3 and 4 and an upper and a lower support members 5 and 6 in which the upper and the lower dies are inserted, in a closed insulated vessel 2 (hereinafter, called a "closed vessel"). The closed vessel 2 is provided with an intake valve 9a which supplies an inert gas such as nitrogen, a gas inflow passage 7 and an exhaust port 8 and an exhaust valve 9b which exhaust the inert gas, and is connected to a gas source not illustrated, and an inside of the closed vessel is in an inert gas atmosphere. Further, by an insulating material, the closed vessel is thermally insulated from the outside and the thermal efficiency is enhanced. The upper and the lower dies 3 and 4 are each formed into a flanged cylindrical shape, a material thereof is glassy carbon, the lower die 4 has a concave die surface 4b in the shape of a lens facing upward on a flange side (top surface) 4a, and is supplied with a germanium raw material 10. A ring-shaped relief portion 4c is provided at an outer circumferential edge of the die surface of the lower die. The upper die 3 has a die surface 3b facing downward on a half flange side (undersurface) 3a. The die surface 3b of the present embodiment is a planar surface.

Glassy carbon which is the material of the upper and the lower dies 3 and 4 is used in a carbon electrode and the like, the property thereof is rigid and dense, has a potential window which is wide in an oxidizing direction and a reducing direction, and is said to be easy to use electrochemically. Further, glassy carbon is a carbon material in a black glass state excellent in chemical resistance, and is excellent in heat resistance with low surface roughness. In the present embodiment, as glassy carbon, Glassy Caron (trade name) by TOKAI CARBON CO., LTD. is used. Note that it goes without saying that any material which has a similar property is properly usable without being limited to the present material.

An upper die and a lower die temperature sensors 11 and 12 are provided in interiors of the upper die 3 and the lower die 4, which are close to the respective wall surfaces on a center axis c of the die surface 3b of the upper die and the die surface 4b of the lower die. Cylinder portions 3e and 4e which are adjacent to flanges 3d and 4d of the upper die 3 and the lower die 4 are respectively inserted into a lower side surface flanged insertion hole 15a of a main body 15 of the upper support member 5, and a flanged upper side surface insertion hole 16a of a main body 16 of the lower support member 6. Both flange portions 3d and 4d are held and fixed by a lower end 25a and an upper end 26a of lid portions 25 and 26 of the upper limit support members 5 and 6, and step portions 15b and 16b of the main body portions 15 and 16, and the upper and lower dies 3 and 4 are respectively fixed to the upper and the lower support members 5 and 6.

The upper support member 5 and the lower support member 6 are connected to rods 35a and 36a of air pressure cylinders 35 and 36 which are respectively moving devices. Air pressure cylinder main bodies 35b and 36b are respectively mounted on a top and a bottom of an outside of the closed vessel 2 with flanges 35*c* and 36*c*. An air pressure source and a control valve not illustrated are connected to each of the air pressure cylinders, the upper support member 5 and the upper die 3, or the lower support member 6 and the lower die 4 are made movable in a vertical direction, and the upper die and the lower die are made abuttable on or separable from each other. Note that the moving device may be a slide mechanism or the like driven by a ball screw, a rack and pinion or the like, besides the air pressure cylinder or the like.

A gap 17*a* is provided between a center portion 25*c* of an undersurface 25*b* of the upper support member lid portion 25, and a top surface 3*f* of the upper die 3. In a center of the upper support member lid portion 25, a cooling inert gas blowout port 18*a* is opened to the gap 17*a*. Further, the cooling inert gas blowout port 18*a* is connected to a valve and an inert gas supply device not illustrated outside the closed vessel 2 via a flexible hose 20*a*. At equidistant four spots around the cooling inert gas blowout port 18*a* of the upper support member lid portion 25, cooling inert gas exhaust ports 19*a* are opened to the gap 17*a*, and communicate with the inside of the closed vessel 2 via a communication passage 21*a* in the upper support member lid portion 25.

Similarly, a gap 17*b* is provided between a center portion 26*c* of a top surface 26*b* of the lower support member lid portion 26, and an undersurface 4*f* of the lower die 4. In a center of the lower support member lid portion, a cooling inert gas blowout port 18*b* is opened to the gap 17*b*. Further, the cooling inert gas blowout port 18*b* is connected to a valve and an inert gas supply device not illustrated outside the closed vessel 2 via a flexible hose 20*b*. At equidistant four spots around the cooling inert gas blowout port 18*b* of the lower support member lid portion 26, cooling inert gas exhaust ports 19*b* are opened to the gap 17*b*, and communicate with the inside of the closed vessel 2 via a communication passage 21*b* in the lower support member lid portion 26.

With a position where the upper die 3 and the lower die 4 abut on each other as a vertical center, a heating device (heater) 22 is provided around the upper and the lower dies, and is enabled to perform heating so that the temperatures of the insides 3*b* and 4*b* of the upper and the lower dies are to be a temperature exceeding the melting point of germanium. Further, a heating device temperature sensor 23 which measures a temperature inside the heating device is provided.

Figure 2:
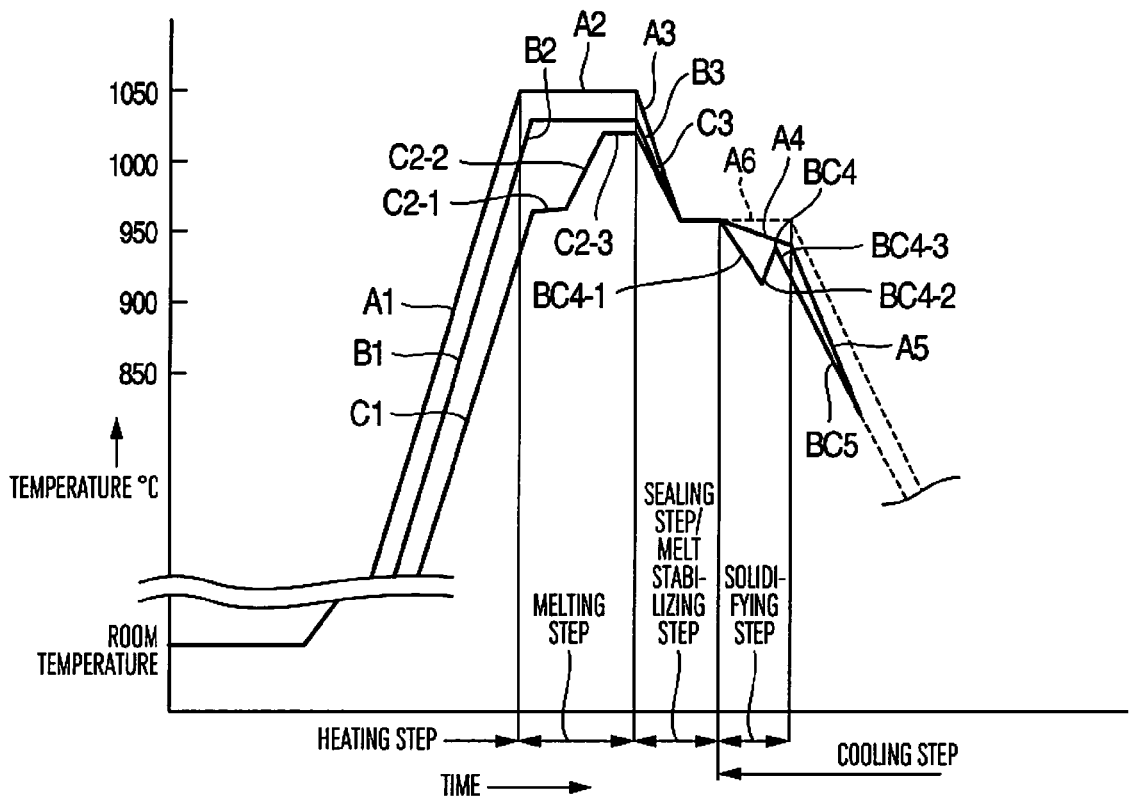
FIG. 2 is a time-temperature relationship diagram schematically showing a temperature change of a melt molding method of germanium showing the embodiment of the present invention, while an axis of ordinates represents a Celsius temperature, and an axis of abscissa represents an elapsed time.

Next, a germanium melt molding method using the above germanium melt molding apparatus 1 will be described. Note that for simplification of the description, the position of the lower die 4 is fixed, and only the upper die 3 is raised and lowered. In FIG. 1, first, in a rising end position of the upper die, an opening not illustrated of the closed vessel 2 is opened, and a predetermined amount of germanium ingot is placed on the die inside 4*b* of the lower die 4. Next, the closed vessel 2 is hermetically closed, the exhaust valve 9*b* and the supply valve 9*a* are opened to seal nitrogen gas in the closed vessel, and the nitrogen gas is filled while air is expelled. When sealing of the nitrogen gas is completed, both valves 9*a* and 9*b* are closed. Next, the heating device 22 is operated to perform heating so that the heating device inside temperature reaches a predetermined temperature of approximately 1050° C. which is higher than the germanium melting temperature (melting point of 939° C.) (called a "heating step"). Note that the predetermined temperature is properly set at a temperature or a heat quantity at or with which the temperature at the time of germanium melting can stably transition in accordance with the size of the apparatus, arrangement of the heating device to the apparatus, size and the like. Note that FIG. 2 illustrates qualitative temperature for explanation. Accordingly, the data of FIG. 2 differs from actual data.

As shown by reference sign A1 of FIG. 2, the heating device inside temperature reaches the predetermined temperature with time, whereas temperature increases in the upper and the lower dies 3 and 4 are delayed as shown by reference signs B1 and C1. Further, when the temperature of the inside of the lower die 4 reaches a temperature not lower than the germanium melting point, melt of germanium starts. At this time, as shown by reference numeral A2, the temperature of the heating device inside sensor 23 reaches the predetermined temperature to be constant, and further as shown by reference sign B2, the temperature of the temperature sensor 11 of the upper die 3 continues to increase. However, as shown by reference sign C2-1, the temperature of the temperature sensor 12 of the lower die 4 levels off. After a lapse of a certain time period, as shown by reference sign C2-2, the temperature of the temperature sensor 12 of the lower die 4 starts increase again (called a "melting step"). It is conceivable that this is because heat of melting at the time of melt of germanium is absorbed, the temperature increase is reduced or levels off, and after melt is completed, the temperature increases by heating by the heating device again. The temperature of the lower die temperature sensor changes to increase again from leveling off and the temperature of the lower die temperature sensor is 1000° C. or higher in the device of the example, although the temperature of the lower die temperature sensor varies in accordance with the capacity or the like of the heating device.

A time point at which the temperature 12 of the lower die temperature sensor changes so as to increase again from leveling off is regarded as completion of melt of germanium, and after the temperature changes so as to increase again (in reality, after a predetermined time period shown by reference sign C2-3 elapses, or after the temperature of the lower die temperature sensor reaches 1000° C. or higher), the control temperature of the heating device is decreased so that the temperatures of the heating device 22 and the upper and the lower dies 3 and 4 are decreased to reach a temperature (in the present embodiment, 950 to 960° C., the same shall apply hereinafter) slightly higher than the melting point as shown by reference signs A3, B3 and C3, and the germanium 10 is brought into a state in which the germanium 10 is stabilized entirely while remaining in a molten state (called a "melt stabilizing step").

At this time, in the lower die 4, the liquid germanium 10 is melted to swell from the die inner face 4*b* by surface tension. The upper die 3 is lowered simultaneously with or later than the control temperature of the heating device 22 being decreased, and the upper die 3 is caused to abut on the lower die 4. Thereby, the germanium 10 is filled in the upper and the lower die inner faces 3*b* and 4*b*. However, the germanium 10 does not fill the relief portion 4*c* after solidification yet.

Next, from the valve and the inert gas supply device not illustrated, nitrogen gas at a room temperature (hereinafter, called "cooling gas") as cooling inert gas is blown out toward the gaps 17*a* and 17*b* from the cooling inert gas blowout ports 18*a* and 18*b*, the central portion of the upper and the lower dies 3 and 4 is forcefully cooled. The cooling gas is discharged into the closed vessel 2 through the cooling inert gas exhaust ports 19*a* and 19*b* and the communication passages 21*a* and 21*b*. Furthermore, the exhaust valve 9*b* is opened, and the cooling gas is discharged to an outside through the exhaust port 8 and the exhaust valve 9*b*.

Thereby, the upper and the lower dies 3 and 4 are gradually cooled toward the outer sides from the center portions, and the germanium 10 in the upper and the lower die surfaces starts solidification from the center portion (called a "solidifying step"). The germanium 10 reaches the solidification temperature lower than the melting temperature and is solidified, and the temperatures of the upper and the lower die temperature sensors 11 and 12 do not continue to decrease just the way they are, but change to increase as shown by reference sign BC4-2 (910 to 920° C.) from decrease of reference sign BC4-1. Thereafter, the temperatures change to decrease again as shown by reference sign BC4-3 (925° C.). This point of time is set as solidification completion.

In the solidifying step, the molding die external ambient temperature is controlled by the heating device so that the molding die external ambient temperature gradually decreases uniformly as shown by reference sign A4. The control temperature of the molding die external ambient temperature is set to decrease uniformly (A4), but is controlled not to be the reincreased temperature BC of the molding die inner temperature or lower (a slightly high temperature taking account of a measurement error).

After the temperature changes to decrease, after a predetermined time elapses, the power supply of the heating device 22 is turned off while supply of the cooling gas remains to be continued, and the entire inside of the closed vessel 2 is cooled (called a "cooling step"), as shown by reference signs A5 and BC5. When the temperature is decreased to a room temperature or a handlable temperature, supply of the cooling gas is stopped, the upper and the lower dies 3 and 4 are opened, and the germanium molded product which is molded is taken out. Note that the described temperatures are temperatures measured in the embodiment, are affected by performance, an installation place and a situation of the temperature sensor, and therefore do not show accurate temperature in terms of physical properties. Further, reference signs A5 and BC5 show different temperatures, but may be the same temperature or inversion temperatures.

EXAMPLE

Figure 3A:
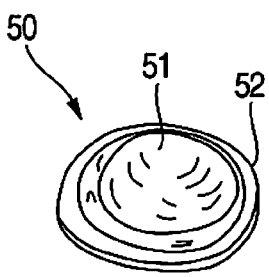
FIGS. 3A and 3B are outside schematic views of a lens molded product showing the embodiment of the present invention.

An example obtained by the above apparatus and method will be described. FIG. 3A is an outer photograph of a lens molded product produced according to the embodiment of the present invention. As shown in FIG. 3A, the present lens molded product 50 has a lens main body 51 and a burr portion 52. The lens main body 51 does not have bulges or defects, and is formed into a shape along the insides of the upper and the lower die surfaces. Further, the surface roughness is also favorable, and precision is such an extent to be directly usable as a lens without post processing except for the burr portion. The burr portion 52 is formed along an edge of the relief portion 4c. Since the burr portion 52 is a relief at the time of solidification, and is finally solidified, the surface roughness and the shape are poor.

Figure 3B:
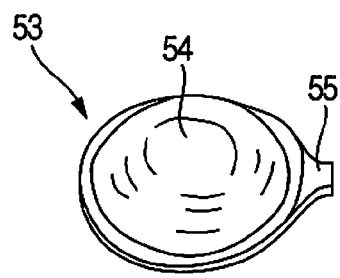

Further, FIG. 3B is an example of an aspherical lens. In a present lens molded product 53, a main body 54 does not have bulges or defects, and surface roughness and shape precision are favorable, similarly to the case of FIG. 3A. A burr portion 55 gathers at one spot instead of the entire circumference of the lens, extends into a tongue shape and is solidified, and the shape is stable. The difference of FIGS. 3A and 3B can be changed by the amount of the raw material, the capacities of the die insides 3b and 4b and the relief portion 4c.

Figure 5:
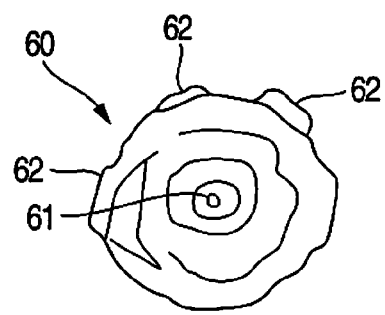
FIG. 5 is an outside schematic view showing an example of a molded product of a lens molded by a conventional method.

Meanwhile, in the lens molded product which is cooled without providing the solidifying step of the embodiment of the present invention, bulges occur to a main body 61 of a lens 60, the shape is poor, and cannot be directly used as a lens at all, as shown in FIG. 5. Further, burr portions 62 occur to several spots, the locations, sizes and extending directions thereof are random, which is a state considered to be a result of unstable solidification being performed. Further, the variation of the molded products was large, and constant shapes were not obtained.

Figure 4A:
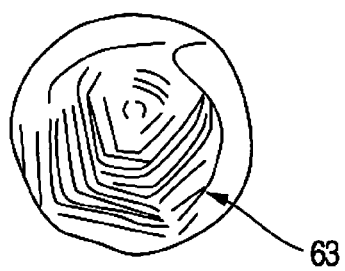
FIGS. 4A and 4B are schematic views showing an internal transmission situation of the lens molded product showing the embodiment of the present invention.
Figure 4B:
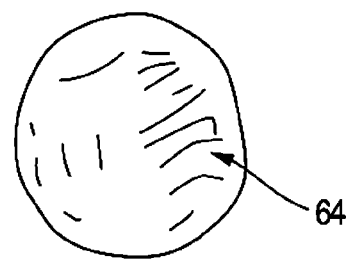

Further, FIGS. 4A and 4B are schematic views showing an internal transmission situation of a lens molded product by using an infrared ray and an infrared camera by using a schlieren method. Note that the internal transmission device itself is specially produced, but is not directly related to the content of the invention of the present application, and therefore, the description thereof will be omitted. FIG. 4A is a schematic view of the internal transmission situation of the molded lens in a case in which a molded die external ambient temperature at the time of the solidifying step is kept constant to be a substantially melting temperature as shown by a dotted line (reference sign A6), whereas FIG. 4B is a schematic view of the internal transmission situation of the molded lens in a case of the molding die external ambient temperature at the time of the solidifying step is decreased at a constant speed from the substantially melting temperature as shown by a solid line (reference sign A4). As shown in FIG. 4A, in the case of the constant temperature, ununiform portions 63 which seem to be crystal grain boundaries expanding in the diameter direction in polygonal shapes are recognized. In contrast, when the temperature is gradually decreased according to the invention of the present application, it is found that portions 64 which seem to be crystal grain boundaries become vague, the number thereof decreases, and the quality as a lens becomes significantly favorable.

As above, as shown in the present embodiment, control can be performed so that solidification advances from the central portion to the whole thereof by cooling the central portion at the time of germanium solidification, and therefore, the germanium molded product without bulges, with a stable shape and few variations can be obtained. Further, since the difference between the molding die external ambient temperature and the temperature in the molding die is made small, the solidifying speed and the solidifying direction are stabilized and the quality is improved. Furthermore, the temperature of the die temperature sensor is monitored, the temperature increases again after the temperature decreases at the time of the solidifying step, and the temperature at the time of changing to decrease again can be determined as completion of solidification at the time of the solidifying step. Therefore, control is easy, repeatability is facilitated, stabilization of the products, and identification of the quality are facilitated.

Note that it goes without saying the respective set temperatures are properly set in accordance with the germanium raw material, the apparatus, the kind and the installation position of the temperature sensor, the shape of the die and the like. Further, in the aspect of the present embodiment, the melting point is set as 939° C., but is 937.4° C. in JP-A-63-157754, and 958.5° C. in JP-A-07-314123, and therefore the melting point is not always constant depending on the respective conditions, purities and the like. Further, measurement of the accurate values of the melting point and the solidifying point is difficult, and the values are properly determined in accordance with the material and the apparatus. Further, the amount of the cooling gas is properly set in accordance with the arrangement of the heating device, the sizes, arrangement and the like of the dies. Further, the upper and the lower dies are not limited to the same, but may differ from each other or changed. Further, the upper and the lower dies are described with respect to the case of one lens, but it goes without saying that the upper and the lower dies can be also applied to a plurality of lenses, a lens array and the like. It goes without saying that it is useful and possible to make the temperature difference smaller and eliminate change by controlling the temperature of the molding die external ambient temperature in response to the temperature in the molding die.

The invention claimed is:

1. A melt molding method of germanium, including the steps of:
    arranging a molding die including an upper die and a lower die in an inert gas atmosphere, the upper die raised to be separated from the lower die;
    arranging a heating device around the upper and lower dies so as to provide a space between the heating device and the upper and lower dies;
    placing a solid germanium raw material in the lower die;
    heating the molding die with the heating device while keeping the upper and lower dies separated, so that the germanium raw material is melted;
    turning down a set temperature of the heating device after both the upper and lower dies reach a temperature higher than a melting point of the germanium raw material, the temperature of each of the upper and lower dies being measured at a point in the upper and lower dies close to a die surface of the upper and lower dies;
    lowering the upper die to abut the lower die;
    cooling the molding die by blowing cooling inert gas to a central portion of the upper die from above and to a central portion of the lower die from below so that each one of the upper and lower dies is gradually cooled outward from the central portion thereof and the germanium is solidified; and
    further lowering the set temperature of the heating device after the solidification of the germanium raw material is completed;
wherein:
    the solidification of the germanium raw material is complete when the temperatures of the upper and lower dies decrease subsequent to the blowing of the cooling inert gas, the temperatures of the upper and lower dies thereafter increase due to latent heat of the germanium raw material, and the temperatures of the upper and lower dies begin to decrease again; and
    the cooling of the molding die includes controlling the set temperature of the heating device so that an external ambient temperature in the space between the molding die and the heating device decreases while being kept at a temperature equal to or higher than the temperatures of the upper and lower dies until the solidification of the germanium raw material is complete.

2. The melt molding method of germanium according to claim 1, wherein a molding die inner shape of the molding die is a lens shape.

3. The melt molding method of germanium according to claim 2, wherein the molding die inner shape is formed by the lower die having a concave shape and the upper die having a planar or convex shape, and the upper die is fitted to the lower die to perform molding while an excessive germanium raw material is allowed to escape after the germanium raw material is melted.

* * * * *